Dec. 1, 1925.
A. J. GILDEN
1,564,135
AUTOMATIC GAS CUT-OFF FOR GAS WATER HEATERS
Filed July 23, 1923
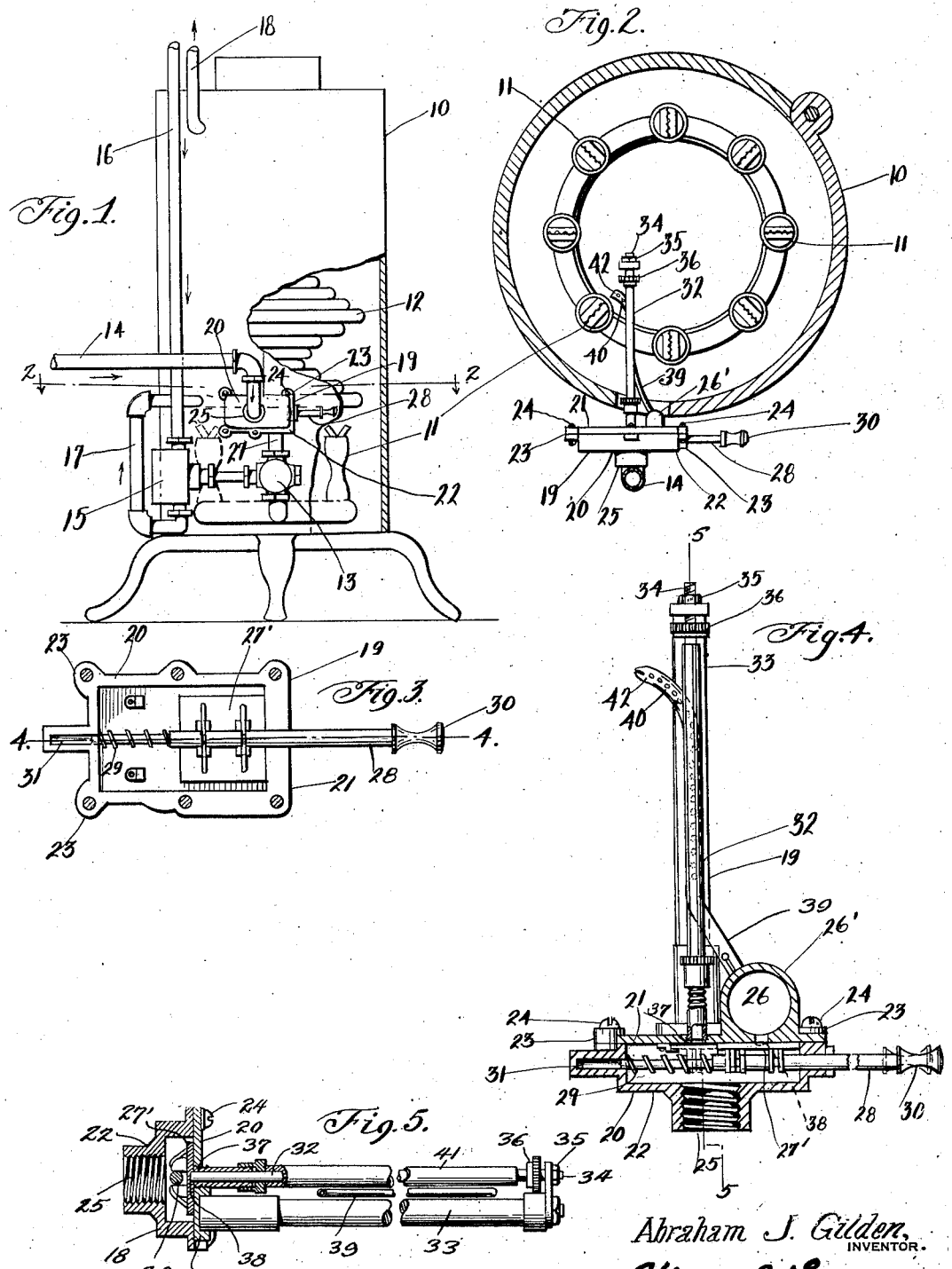
Abraham J. Gilden,
INVENTOR.
BY Victor J. Evans,
ATTORNEY.
WITNESS:

Patented Dec. 1, 1925.

1,564,135

UNITED STATES PATENT OFFICE.

ABRAHAM J. GILDEN, OF NEW YORK, N. Y., ASSIGNOR TO SAFETY GAS JET CO., INC., OF NEW YORK, N. Y., A CORPORATION OF NEW YORK.

AUTOMATIC GAS CUT-OFF FOR GAS WATER HEATERS.

Application filed July 23, 1923. Serial No. 653,389.

*To all whom it may concern:*

Be it known that I, ABRAHAM J. GILDEN, a citizen of the United States, residing at New York, in the county of New York and State of New York, have invented new and useful Improvements in Automatic Gas Cut-Offs for Gas Water Heaters, of which the following is a specification.

This invention relates to a combined pilot light and automatic cut off for gas water heaters and more particularly to water heaters of the automatic type.

The principal object of the invention is the provision of a combined pilot light and gas cut off for automatic gas water heaters whereby the flow of gas to the burner and pilot light is automatically cut off when the pilot light accidentally becomes extinguished.

Another object of the invention is to provide a thermally controlled pilot light adapted to be disposed adjacent the burner of an automatic gas water heater and which will automatically light the burner when the flow of gas is automatically turned on.

Another object is to provide a combined pilot light and automatic gas cut off which can be easily and quickly applied to the well-known type of automatic and instantaneous gas water heaters without changing the arrangement of parts of said heaters.

A still further object is the provision of a device of the nature mentioned which is exceedingly simple in construction, cheap of manufacture and highly efficient and positive in operation.

With these and other objects in view the invention resides in the certain novel construction, combination and arrangement of parts, the essential features of which are hereinafter fully described in the specification, are particularly pointed out in the appended claims and are illustrated in the accompanying drawing, in which:—

Figure 1 is an elevational view showing my invention applied to an automatic gas water heater.

Figure 2 is a horizontal sectional view on the line 2—2 of Figure 1.

Figure 3 is a vertical longitudinal sectional view through my invention.

Figure 4 is a horizontal sectional view on the line 4—4 of Figure 3, showing in dotted lines the position of the various parts when the valve is in its open position.

Figure 5 is a detail sectional view on the line 5—5 of Figure 4.

My invention is primarily used in connection with automatic gas water heaters, wherein the flow of water or the temperature of the same controls the flow of gas to the burner. All of these heaters are lighted by means of a pilot light, but it often happens that the pilot light may be accidentally extinguished thus permitting the gas to escape unlighted from the burners which is often very dangerous as to cause explosions, and other fatalities through the inhalation of the gas. It is therefore my invention to provide a combined pilot light and automatic gas cut off for stopping the flow of gas to the burner when the pilot light becomes accidentally extinguished.

Like characters of reference refer to like parts throughout the several views of the drawings.

Referring more particularly to the drawing, the reference numeral 10 designates an automatic gas water heater, of any suitable well-known type which includes a plurality of burners 11 arranged at the bottom of the heater, and a heating coil 12 disposed above the burners. The numeral 13 designates an automatic gas valve, 14 a gas inlet pipe, 15 an automatic gas water valve, 16 a cold water inlet pipe leading to the valve 15 from a source of supply, 17 a pipe leading from said valve 15 to the coil 12, and 18 is a hot water outlet pipe leading from the coil 12 to the various hot water faucets. In this type of heater the flow of gas from the gas inlet pipe 14 to the burners, passes through the automatic gas valve 13 which is controlled by the pressure of water passing through the water valve 15 from the pipe 16, when the faucets are turned on. This construction is all very old in the art and no claim is made to the same, but has merely been shown to clearly illustrate the purpose of my invention.

My combined pilot light and automatic gas cut off is designated at 19 and is arranged between the gas inlet pipe 14 and the automatic gas valve 13, and the same includes a casing 20 made up of a pair of co-acting sections 22 and 21 and provided with ears 23 for receiving fastening elements 24 in the nature of screws, which serve to hold the two sections together. The section 22 is provided with an inlet 25 arranged centrally therein and to which the pipe 14 communicates, and the section 21 is provided with a boss 26' arranged at one end thereof and provided with an outlet port 26, the same having communication with the bore of the boss 26', and the interior of the casing. The boss 26' has connection with a section of pipe 27 leading to the automatic gas valve 13. Slidable within the casing 20 is a valve head 27', keyed to a plunger rod 28 and adapted to close the outlet 26 when the same is in normal position as shown in full lines in Figure 4 of the drawing. A helical spring 29 surrounds one end of the plunger rod 28 and is interposed between one end of the casing 20 and the valve head 27' to hold same into a position to close the outlet 26. The plunger rod 28 has a manipulating head 30 at one end thereof, and the other end of the rod extends into an extension 31 formed on one of the end walls of the section 22 and serves as a bearing and guide for the plunger rod when the same is depressed.

In order to hold the valve head 27' in a position so as to uncover the outlet 26, I employ a thermostatic rod 32, having one end rigidly held to a supporting bracket 33 carried by the section 21 of the casing. The thermostatic rod 32 is threaded at this particular end as at 34, for receiving a jam nut 35, and integral with the rod 32 adjacent the threaded portion is a knurled portion 36, for use when it is desired to adjust the length of the rod with relation to its fixed point. The other end of the rod 32 extends into an opening 37 in the section 21 of the casing, and is adapted to co-act with a recess 38 in the valve head 27' when the same is depressed to open the outlet 26. A Bunsen burner tube 39 is tapped in the boss 26' and communicates with the outlet 26. This tube 39 is interposed between the bracket 33 and the thermostatic rod 32 so that the major portion of the tube underlies the thermostatic rod but the same has its end curved as at 42 and open so that a flame at the end of the same will be free to serve as a pilot light for the burner 11. The tube 39 is also provided with a plurality of perforations 40, arranged in the portion underlying the thermostatic rod 32 and which when lighted serve to heat the rod 32 to expand the same for a purpose which will be presently described. If desired the rod 32 may be surrounded by a sleeve 41 for preventing the blackening of the rod which is caused by the flame from the openings 40.

In operation the plunger rod 28 is pushed inward so as to bring the recess 38 of the valve in alignment with the axis of the thermostatic rod 32, thus permitting the flow of gas from the pipe 14 through the casing 20 to the pilot burner tube 39. The burner tube is now lighted and the flame from the same will heat the thermostatic rod 32 so as to expand the rod and by reason of the rigid connection with the bracket, the rod will expand into the recess 38 of the valve head, as shown in dotted lines in Figure 4 of the drawing. So long as the pilot light is burning, the valve will be held in this position, but should the same become accidentally extinguished the rod 32 will contract thereby permitting the same to be disengaged by the recess 38, thereby permitting the valve head to automatically move to its closed position by reason of the spring 29. It will therefore be seen that when the pilot light is burning the same will cause the outlet port 26 to be held open for allowing the gas to flow to the automatic valve 13, and when the valve 13 is open by reason of the flow of water through the automatic water valve 15 that the burner tube 39, being disposed above the burners 11, will cause the same to be instantly lighted. It will also be understood that when the pilot flame is extinguished the valve 26 will close thereby shutting off the flow of gas to the burners 11 irrespective of the position of the valve 13.

I also wish it to be understood that my combined pilot light and automatic cut off may be used on various other types of gas heaters, but the same is primarily intended for use in connection with the automatic type herein set forth.

While I have shown and described what I deem to be the best embodiment of my invention, it is to be understood that no limitation is necessarily made to the precise structural details herein exhibited, but that changes, alterations and modifications as come within the claims may be resorted to when desired.

What I claim as new is:—

1. A device of the class described comprising a casing, a gas inlet and outlet in said casing, a sliding valve having a recess therein, means for normally holding said valve in a position adjacent said outlet, a thermostatic element having one end extending into said casing and adapted to co-act with the recess in said valve to hold same in an open position, means for rigidly securing the other end of said thermostatic element, said means including an arm extending from said casing for supporting said element, a burner tube having communication with said outlet and adapted to be interposed between said arm and said thermostatic element to heat the latter for expanding said element into said recess.

2. A thermal device for use in connection with automatic gas water heaters comprising a casing having inlet and outlet ports, a plunger rod, a valve head secured to said plunger rod, a recess in said valve head, means for normally holding said valve head adjacent said outlet port, a thermostatic rod fixedly held at one end, the other end of said rod extending within said casing and adapted to co-act with said recess when the valve head is moved to open said outlet port and upon the expansion of said thermostatic rod and adapted to be withdrawn from said recess upon the contraction of said thermostatic rod, whereby said valve head is moved to close said outlet port, and a burner tube having communication with said outlet port and formed with flame openings therein, a portion of said burner tube underlying said thermostatic rod with the openings facing said rod to heat the same, and a portion of said burner tube being disposed to one side of said thermostatic rod and serving as a pilot light for the burner of a gas water heater.

In testimony whereof I have affixed my signature.

ABRAHAM J. GILDEN.